United States Patent [19]

Rust et al.

[11] Patent Number: 4,862,311

[45] Date of Patent: Aug. 29, 1989

[54] OVERVOLTAGE PROTECTOR FOR USE WITH DATA CABLES

[75] Inventors: Wayne Rust, Chicago, Ill.; John S. Bonnesen, Eden Prairie, Minn.

[73] Assignee: Reliance Comm/Tec Corporation, Chicago, Ill.

[21] Appl. No.: 180,382

[22] Filed: Apr. 12, 1988

[51] Int. Cl.[4] .................................... H02H 9/04

[52] U.S. Cl. .................................... 361/91; 361/111; 361/119; 439/96; 439/608; 439/620

[58] Field of Search .................... 439/95, 96, 608, 620; 361/91, 111, 117, 118, 119

[56] References Cited

U.S. PATENT DOCUMENTS

| | | | |
|---|---|---|---|
| 4,104,693 | 8/1978 | Toda et al. | 361/120 |
| 4,491,893 | 1/1985 | Toda | 361/120 |
| 4,500,862 | 2/1985 | Shedd | 361/118 |
| 4,511,196 | 4/1985 | Schuler et al. | 439/96 |
| 4,659,161 | 4/1987 | Holcomb | 439/620 |
| 4,695,916 | 9/1987 | Satoh et al. | 361/91 |
| 4,768,977 | 9/1988 | Gliha, Jr. et al. | 439/620 |

*Primary Examiner*—A. D. Pellinen
*Assistant Examiner*—Jeffrey A. Gaffin
*Attorney, Agent, or Firm*—Michael M. Rickin

[57] ABSTRACT

An overvoltage protector for use with data cables. The protector is connected between the data cable and the piece of equipment to which the data cable is ordinarily connected. The equipment has a chassis ground. The protector includes first and second connectors for connection to the equipment and data cable, respectively as well as a protection circuit and a ground plane. The protection circuit is connected between the data cable connector, the equipment connector and the ground plane. The ground plane is in electrical connection with the conductive shell of the equipment connector. The protector is designed such that the ground plane is brought into electrical connection with the chassis ground when the protector is connected between the data cable and the equipment.

19 Claims, 3 Drawing Sheets

OVERVOLTAGE PROTECTOR FOR USE WITH DATA CABLES

BACKGROUND OF THE INVENTION

1. Field of the Invention

This invention relates to an overvoltage protector for use with a data cable and more particularly to such a device which is designed to be connected between the equipment to be protected and the data cable and utilize the equipment's chassis ground as the ground reference for surge suppression.

2. Description of the Prior Art

Mainframe computers, minicomputers and other similar data processing equipment have proliferated in the office environment. It has been quite common for such equipment to be connected to terminals usually located in the same office building for the purposes of data transmission. The data processing equipment typically includes an input/output port which meets the EIA's RS-232C specification ("the RS-232C port"). The connection may then be accomplished by using data communication cables ("data cables") to connect the RS-232C port of one unit either directly or through some intermediate piece of equipment to the RS-232C port of another unit.

Surges may appear on such data cables by any one of a number of causes. A surge may be induced on a data cable by lightening, AC power line disturbances, electrostatic discharge or even as a result of the explosion of an atomic device above the atmosphere. The surge appears on the data cable as a rising voltage. The rate at which the surge voltage rises depends on its cause. For example, the surge voltage caused by the atmospheric explosion of an atomic device, also known as electromagnetic pulse, rises at an extremely fast rate. No matter what the source is, it is desired to suppress all such surge voltages before they can cause damage to the integrated circuits of the equipment connected to the data cable.

Various types of surge suppression devices are well known in the art. They may either be solid state devices such as bipolar avalanche diodes, or gas discharge tubes. In general solid state devices respond relatively fast to surges, i.e. they limit overvoltages to a relatively low value, but cannot carry appreciable amounts of current. Gas discharge tubes generally respond more slowly to overvoltages than solid state devices, but can carry appreciable amounts of current. U.S. Pat. Nos. 4,104,693 and 4,491,893 both of which are assigned to the assignee as is the present invention show various examples of gas discharge tubes. The tube described in the '893 patent is capable of responding to electromagnetic pulses.

A surge suppression device whether of the solid state or gas discharge type suppresses a surge by conducting the surge to ground. In the past when such surge suppression devices were used for data cables the ground connection was obtained by using a ground lead external to the protector housing. The lead is meant to be connected to the ground of the AC power line. Such leads are not only inconvenient to connect but also have inductance associated therewith. The inductance interferes with the surge suppression as it opposes the sudden flow of surge current to ground.

It is desirable, therefore, to provide protection for surges induced on data cables. In particular, it is desirable that such a protector include a ground reference which utilizes the chassis ground of the equipment to be protected to thereby minimize any inductive effects. It is also desirable that such surge protection be relatively easy to provide and connect to the data cable and equipment to be protected. It is also desirable that such surge protection be provided in the form of a surge protector which connects to both the data cable and the RS-232C port of the equipment. It is also desirable to provide protection for such surges which have extremely fast rise times.

Summary of the Invention

An overvoltage protector for interconnection between a data cable which has a connector and a connector mounted on a piece of equipment. The equipment has a chassis ground to which the conductive shell of the equipment connector is connected. Ordinarily the data cable connector is connected to the equipment connector.

The protector has a first connector with a conductive shell and a multiplicity of pins. The first connector is designed for connection to the equipment connector so that the conductive shells are in electrical contact when the two connectors are connected. The protector also has a second connector which has a multiplicity of pins and is designed for connection to the data cable connector.

A ground plane in the protector is in electrical connection with the first connector's conductive shell. An overvoltage protection circuit is connected between one of the pins in the first connector, one of the pins in the second connector and the ground plane.

DESCRIPTION OF THE PREFERRED EMBODIMENT

Figure 1:
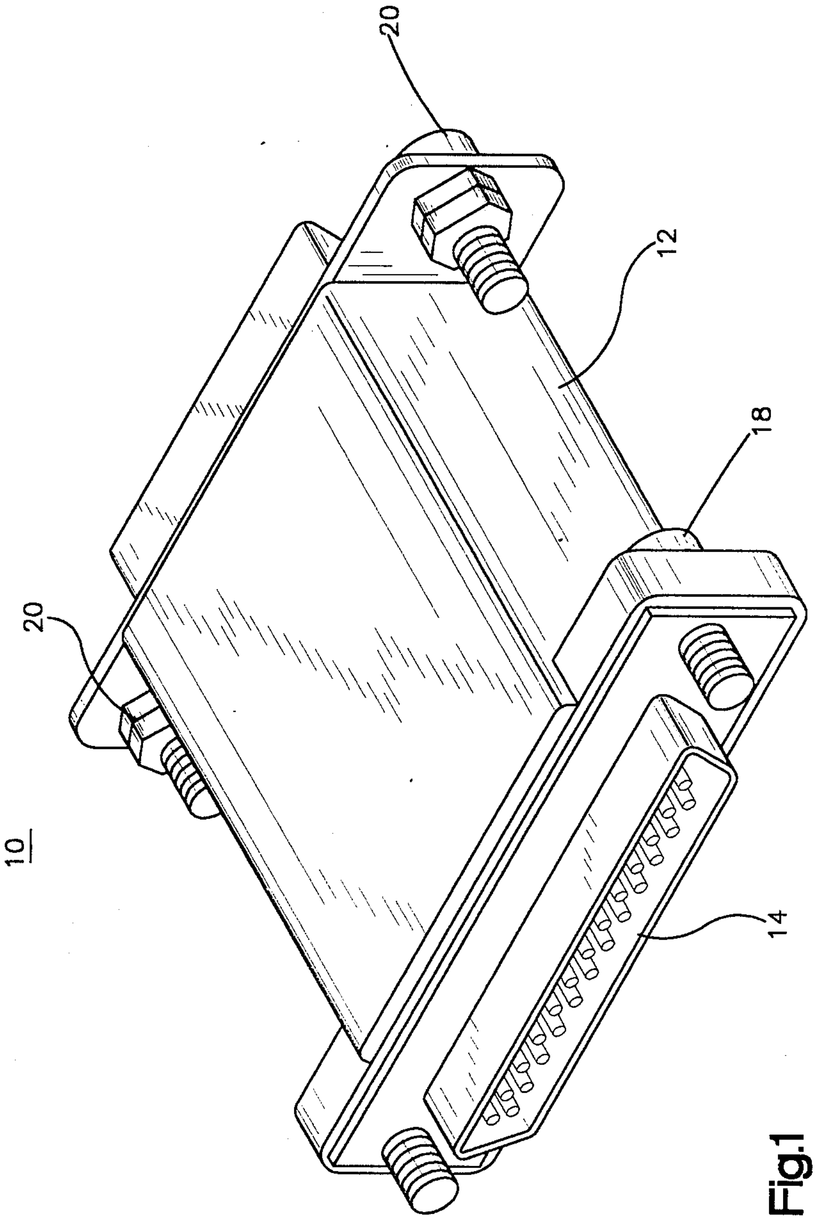
FIG. 1 is an elevated perspective showing the protector of the present invention.
Figure 2:
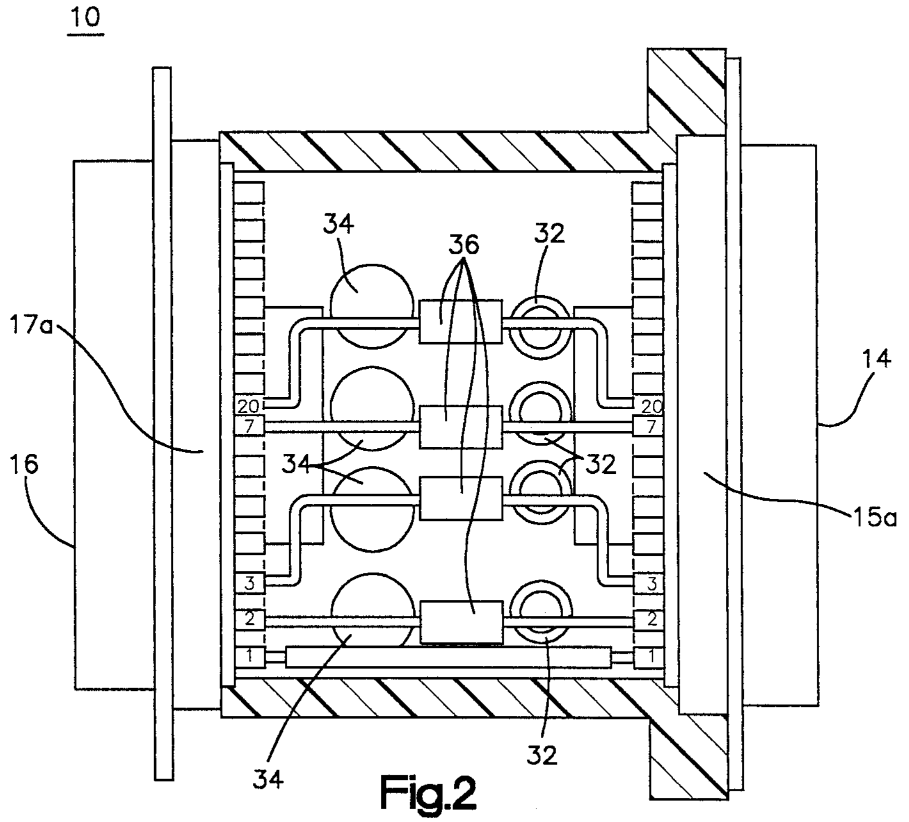
FIG. 2 is a top view of the protector showing the interior thereof.
Figure 3:
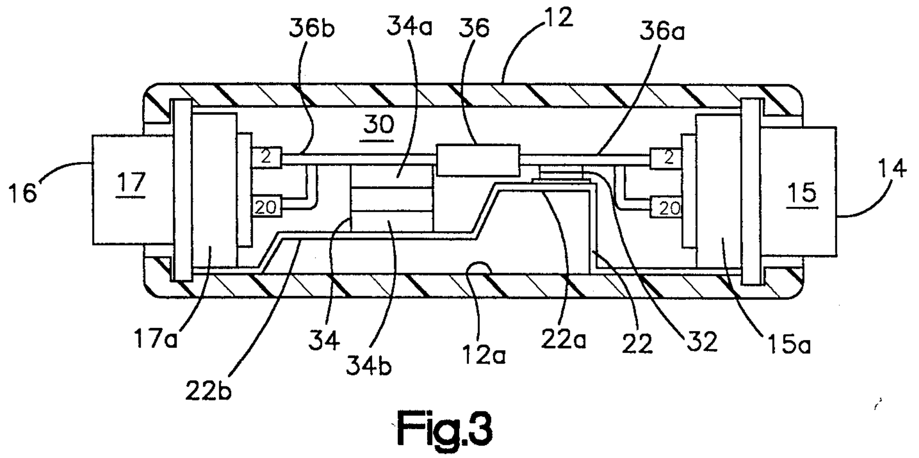
FIG. 3 is a side view of the protector also showing the interior thereof.

Referring now to FIGS. 1, 2 and 3 there is shown the data cable protector 10 of the present invention. The protector 10 includes a two piece snap fit shield 12 made of plastic. Encased at opposite ends of shield 12 are 25 pin D-subminiature connectors 14, 16. Connector 14 mates with a complementary connector (identical in construction to connector 16) mounted on the equipment to be protected. Screws 18 are used in a manner well known in the art to secure connector 14 to that connector. Connector 16 mates with a connector attached to the data cable that would mate with the connector on the equipment in the absence of a protector. The connector attached to the data cable is then identical to connector 14. Sockets 20 are for receiving the screws of the data cable connector so that mated pair are securely attached to each other.

Protector 10 includes a ground plate 22 which is soldered to that part 15*a*, 17*a* of the shell 15, 17 of connectors 14, 16, respectively, which is internal to shield 12. Shells 15, 17 are, of course, made of electrically conductive material. When protector 10 is attached to the equipment to be protected, the shell 15 of connector 14 comes into electrical connection with the shell of the complementary connector mounted on the equipment. That shell is connected to the equipment's chassis ground. Therefore, the attachment of protector 10 to the equipment connects ground plate 22 to the equipment's chassis ground.

Protector 10 provides surge protection for the four circuits that make up the RS-232C port. In accordance with previously established and well known specifications these circuits are connected to pins 2, 3, 7 and 20 of the 25 pin complementary connector mounted on the equipment. Therefore in order for protector 10 to provide surge protection for those circuits, pins 2, 3, 7 and 20 of each of connectors 14 and 16 must be connected to each other by a surge protection circuit 30. Thus, protector 10 will include four such surge protection circuits 30 each associated with a respective one of pins 2, 3, 7 and 20.

Figure 4:
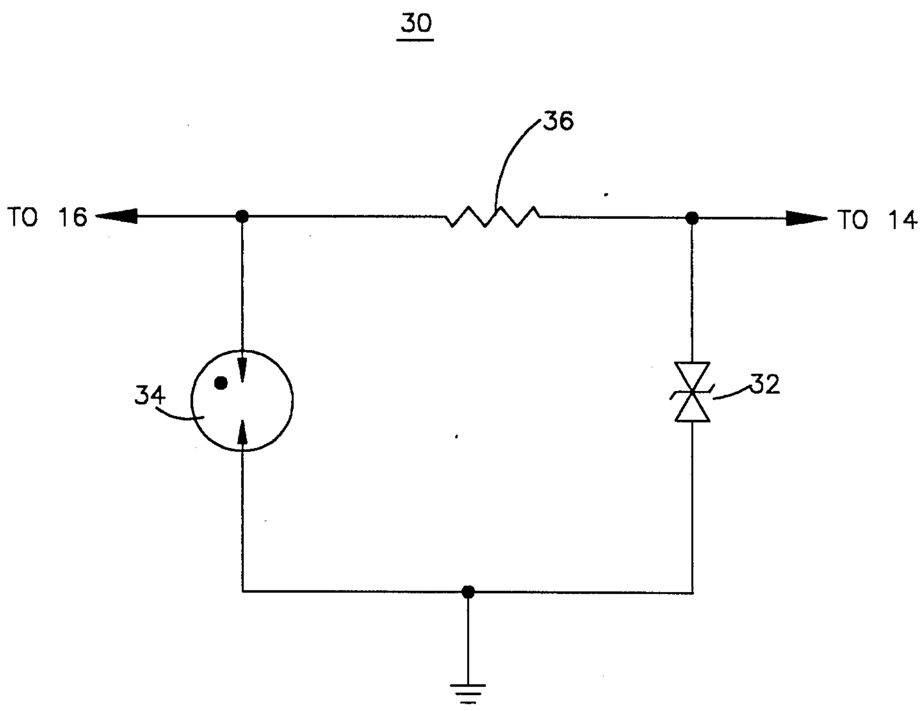
FIG. 4 is a schematic of the surge protection circuit used in the protector.

Referring now to FIG. 4 there is shown a schematic diagram for one embodiment of the surge protection circuit 30 used in protector 10. As protector 10 includes four such identical circuits 30, only one circuit need be described. That circuit will be the one which connects pin 2 of connector 14 to pin 2 of connector 16.

Circuit 30 includes a solid state surge protection device such as bipolar silicon avalanche diode 32 which has one end connected to pin 2 of connector 14 and the other end connected to ground. The circuit 30 also includes a gas discharge tube 34 which has one end connected to pin 2 of connector 16 and the other end connected to ground. A resistor 36 is connected in series between pin 2 of connector 14 and pin 2 of connector 16. The manner in which circuit 30 functions to provide protection will now be described in the next paragraph.

When a surge voltage appears on the data cable, the avalanche diode 32 begins to divert current to ground, clamping the voltage at the input of the equipment to a safe level. The diode 32 responds more quickly than the gas tube 34 can. Diode 32, however, diverts less current to ground than gas tube 34 can divert to ground. If the energy of the surge is sufficient, the current flowing through the diode 32 and resistor 36 will cause a large enough voltage to build up across the gas tube 34 so that the tube 34 fires. This firing of tube 34 diverts the majority of the surge current to ground to thereby relieve any overstressing of the diode 32. Once the surge energy has been dissipated (providing the maximum limits of the protective components have not been exceeded), the gas tube 34 and diode 32 return to their high resistance condition, allowing normal transfer of data on the cable until another surge appears. The protection then operates again.

The manner in which circuit 30 is physically connected in protector 10 to pin 2 of connector 14 and pin 2 of connector 16 and to ground plate 22 will now be described with reference to FIGS. 2 and 3. Connectors 14 and 16 each have two rows of pins with the upper row in each connector having 13 pins and the lower row in each connector having 12 pins which are in a staggered relationship to the upper row pins. Pins 2, 3, 7 and 20 have been so marked in FIG. 2 and pins 2 and 20 have been so marked in FIG. 3.

One lead 36*a* of resistor 36 is soldered directly to pin 2 of connector 14 and the other lead 36*b* is soldered directly to pin 2 of connector 16. Bipolar silicon avalanche diode 32 is a leadless device which is soldered between lead 36*a* and ground plate 22. As diode 32 is relatively short, ground plate 22 has a portion 22*a* which is raised above shield piece 12*a* a sufficient distance so as to contact one end of diode 32. Gas tube 34 is also a leadless device having two electrodes 34*a*, 34*b*. Electrode 34*a* is soldered to lead 36*b* and electrode 34*b* is soldered to raised portion 22*b* of plate 22.

In a circuit 30 constructed as shown in FIG. 4, a 1N6045A bipolar silicon avalanche diode commercially available from General Semiconductor Industries, Inc., Tempe, AZ was used for diode 32. The diode was selected to have a D.C. breakdown voltage in the range of 17.1 to 18.9 volts. Gas discharge tube 34 was selected to have a breakdown voltage of 230 volts. Resistor 36 was selected to have a resistance of 10 ohms.

It should be appreciated that it is the connection of the ground plate 22 internal to protector 10 to the chassis ground of the equipment to be protected which eliminates the need for an external ground lead. In this manner the inductive effect of such a lead is eliminated. It should also be appreciated that any further inductive effect is minimized by use of leadless surge suppression devices which are soldered directly to the ground plate 22.

It should further be appreciated that while circuit 30 has been shown to include two surge suppression devices, the circuit may consist only of a single device connected between pin 2 of connector 14 and ground. Pin 1 of connector 16 is of course still connected to pin 2 of connector 14 to provide electrical continuity. That connection may for example be by a resistor 36 of the type known as a positive temperature coefficient resistor (PTCR). When resistor 36 is of that type, its resistance increases with increases in temperature to thereby limit induced alternating current flowing through the resistor.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. An overvoltage protector for interconnection between a data cable having a connector and a connector mounted on a piece of equipment having a chassis ground, said equipment connector having a conductive shell connected to said chassis ground, said data cable connector ordinarily connected to said equipment connector, said protector comprising:

(a) a first connector having a conductive shell and a multiplicity of pins, said first connector designed for connection to said equipment connector in a manner such that said first connector conductive shell is in electrical contact with said equipment connector conductive shell when said connectors are connected to each other;

(b) a second connector in spaced relationship to said first connector, said second connector having a multiplicity of pins, said second connector designed for connection to said data cable connector;

(c) a planar ground plate extending between said first and second connectors, said plate in electrical connection with said first connector conductive shell; and (d) overvoltage protection means connected between a predetermined one of said first connector multiplicity of pins, a predetermined one of said second connector multiplicity of pins and said ground plate.

2. The protector of claim 1 further comprising a nonconductive housing having first and second openings, said first connector mounted in said first opening and said second connector mounted in said second opening.

3. The protector of claim 1 wherein said second connector also has a conductive shell and said ground plate is in electrical connection therewith.

4. The protector of claim 2 wherein said second connector also has a conductive shell and said ground plate is in electrical connection therewith.

5. The protector of claim 1 wherein said overvoltage protection means comprises:

(i) first overvoltage means connected between said predetermined one of said first connector multiplicity of pins and said ground plate; and (ii) resistive means connected between said predetermined one of said first connector multiplicity of pins and said predetermined one of said connector multiplicity of pins.

6. The protector of claim 5 wherein said resistive means has a positive temperature coefficient.

7. The protector of claim 5 wherein said overvoltage protection means further comprises a second overvoltage means connected between said predetermined one of said second connector multiplicity of pins and said ground plate.

8. The protector of claim 5 wherein said first overvoltage means is a leadless solid state device.

9. The protector of claim 7 wherein said first overvoltage means is a leadless solid state device and said second overvoltage means is a leadless gas tube.

10. The protector of claim 9 wherein said solid state device is selected to have a breakdown voltage in the range of 17.1 to 18.9 volts, said gas tube is selected to have a breakdown voltage of approximately 230 volts and said resistive means is a resistor selected to have a relatively low resistance in the order of 10 ohms.

11. An overvoltage protector for interconnection between a data cable having a connector and a connector mounted on a piece of equipment having a chassis ground, said equipment connector having a conductive shell connected to said chassis ground, said data cable connector ordinarily connected to said equipment connector, said protector comprising:

(a) a nonconductive housing having first and second openings;

(b) a first connector having a conductive shell and a multiplicity of pins mounted in said first opening, said first connector designed for connector to said equipment connector in a manner such that said first connector conductive shell is in electrical contact with said equipment connector conductive shell when said connectors are connected to each other;

(c) a second connector having a multiplicity of pins mounted in said second opening, said second connector designed for connection to said data cable connector;

(d) a planar ground plate extending between said first and second connectors, said plate in electrical connection with said first connector conductive shell; and (e) overvoltage protections means connected between a predetermined one of said first connector multiplicity of pins, a predetermined one of said second connector multiplicity of pins and said ground plate.

12. The protector of claim 11 wherein a second connector also has a conductive shell and said ground plate is in electrical connection therewith.

13. The protector of claim 12 wherein said overvoltage protection means comprises:

(i) first overvoltage means connected between said predetermined one of said first connector multiplicity of pins and said ground plates; and (ii) resistive means connected between said predetermined one of said first connector multiplicity of pins and said predetermined one of said second connector multiplicity of pins.

14. The protector of claim 13 wherein said resistive means has a positive temperature coefficient.

15. The protector of claim 13 wherein said overvoltage protection means further comprises a second overvoltage means connected between said predetermined one of said second connector multiplicity of pins and said ground plate.

16. An overvoltage protector for interconnection between a data cable having a connector and a connector mounted on a piece of equipment having a chassis ground, said equipment connector having a conductive shell connected to said chassis ground said data cable connector also having a conductive shell and ordinarily connected to said equipment connector, said protector comprising:

(a) a nonconductive housing having first and second openings;

(b) a first connector having a conductive shell and a multiplicity of pins mounted in said first opening, said first connector designed for connection to said equipment connector in a manner such that said first connector conductive shell is in electrical contact with said equipment connector conductive shell when said connectors are connected to each other;

(c) a second connector having a conductive shell and a multiplicity of pins mounted in said second opening, said second connector designed for connection to said data cable connector in a manner such that said second connector conductive shell is in electrical contact with said data cable connector conductive shell when said connectors are connected to each other;

(d) a planar ground plate in said housing, said ground plate extending between said first and second connectors and in electrical connection with said first connector conductive shell and with said second connector conductive shell; and (e) overvoltage protection means connected between a predetermined one of said first connector multiplicity of pins, a predetermined one of said second connector multiplicity of pins and said ground plate.

17. The protector of claim 16 wherein said overvoltage protection means comprises:

(i) first overvoltage means connected between said predetermined one of said first connector multiplicity of pins and said ground plate and (ii) resistive means connected between said predetermined one of said first connector multiplicity of pins and said predetermined one of said second connector multiplicity of pins.

18. The protector of claim 17 wherein said resistive means has a positive temperature coefficient.

19. The protector of claim 17 wherein said overvoltage protection means further comprises a second overvoltage means connected between said predetermined one of said second connector multiplicity of pins and said ground plate.

* * * * *